United States Patent [19]

White

[11] Patent Number: 4,462,144

[45] Date of Patent: Jul. 31, 1984

[54] STAMPED LOW FRICTION BEARING, AND PROCESS FOR MAKING SAME

[76] Inventor: Charles A. White, 35815 42nd. St., Palmdale, Calif. 93550

[21] Appl. No.: 132,268

[22] Filed: Mar. 20, 1980

[51] Int. Cl.³ .............................................. B21D 53/10
[52] U.S. Cl. ..................... 29/149.5 DP; 29/149.5 NM
[58] Field of Search ................. 29/149.5 S, 149.5 DP, 29/149.5 NM, 149.5 C, 149.5 R, 527.1, 527.2, 527.3, 527.4

[56] References Cited

U.S. PATENT DOCUMENTS

| | | | |
|---|---|---|---|
| 1,863,809 | 6/1932 | Hopkins et al. | 29/149.5 C |
| 1,892,176 | 12/1932 | Stockfleth | 29/149.5 C |
| 1,892,180 | 12/1932 | Stockfleth | 29/149.5 DP |
| 1,904,770 | 4/1933 | Skillman | 29/149.5 NM |
| 3,047,934 | 8/1962 | Magner, Jr. | 29/149.5 NM |
| 3,252,346 | 5/1966 | Prior | 29/149.5 NM |
| 3,418,706 | 12/1968 | White | 29/149.5 B |
| 3,514,831 | 6/1970 | Bruch et al. | 29/149.5 NM |
| 3,891,488 | 6/1975 | White | 29/149.5 NM |
| 4,137,618 | 2/1979 | Krauss | 29/149.5 NM |
| 4,343,072 | 8/1982 | Beauchet | 29/149.5 DP |

FOREIGN PATENT DOCUMENTS

| | | | |
|---|---|---|---|
| 1060501 | 11/1953 | France | 29/149.5 NM |
| 956201 | 4/1964 | United Kingdom | 29/149.5 B |
| 988258 | 4/1965 | United Kingdom | 29/149.5 NM |

Primary Examiner—Howard N. Goldberg
Assistant Examiner—V. K. Rising

[57] ABSTRACT

A process and apparatus for mechanically bonding a low friction bearing fabric to a perforated support member by juxtaposing sheets of the fabric and perforated metal, and drawing and pressing together the fabric and metal. Also disclosed is a bearing having a perforated metal support member and a bearing fabric bonded thereto.

20 Claims, 24 Drawing Figures

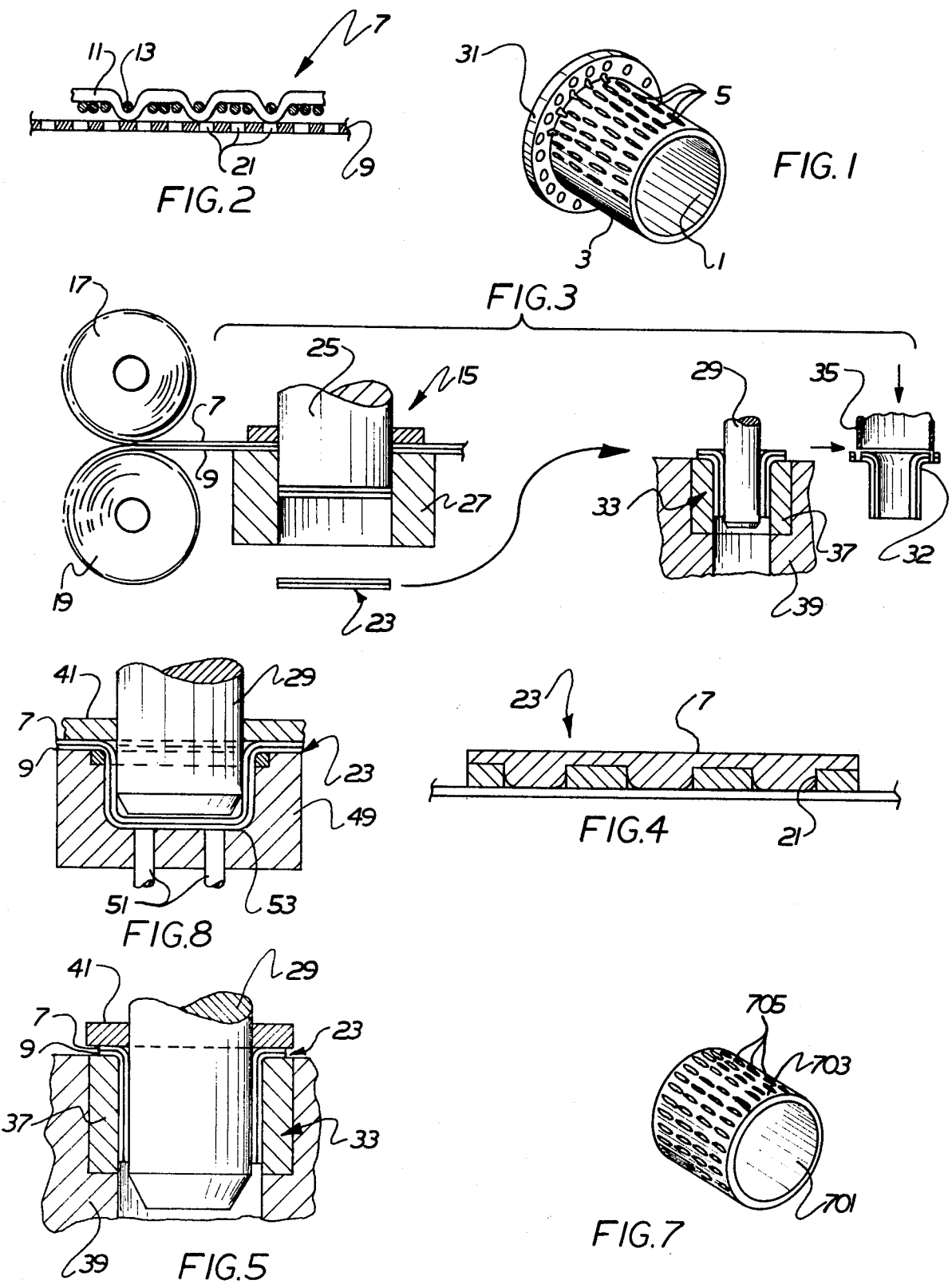

STAMPED LOW FRICTION BEARING, AND PROCESS FOR MAKING SAME

BACKGROUND OF THE INVENTION

This invention relates to bearings, and in particular to shaped low friction bearings having fabric bearing surfaces and metal support members, and methods and apparatus for making the same.

Bearing surfaces are made from various compositions, including thermoplastic resins such as Teflon (trademark of DuPont for polytetrafluoroethylene). The following U.S. patents teach various plastic bearing compositions:

| Inventor | U.S. Pat. No. |
| --- | --- |
| Dodson, et al. | 3,455,864 |
| Ikeda, et al. | 3,779,918 |
| Cairns | 3,879,301 |
| Neinhart, et al. | 3,908,038 |
| Ikeda, et al. | 3,985,661 |
| Cairns | 3,994,814 |

Sometimes fibers, threads, or yarns comprising a low friction material, especially Teflon, is braided, wound, wrapped, knit or woven to form the desired bearing surface. The following U.S. patents disclose bearing surfaces made from low friction fibers:

| Inventor | U.S. Pat. No. |
| --- | --- |
| White | 3,037,893 |
| White | Re 24,765 |
| Osborn, et al. | 3,464,845 |
| Cairns, et al. | 3,781,205 |
| Thomson | 3,033,623 |
| Wayson | 3,711,166 |

Bearings often have backing members, typically metallic, to provide strength, rigidity, and shape. It has been a continuing problem to form the bearing and to simply yet satisfactorily fasten the low friction surface material to the backing member. It has been suggested that low friction materials be molded, sintered, glued, sewn, or clipped onto bearing backings. It has been suggested that perforations in the bearing backing may be useful in securing the low friction material to the backing. The following U.S. patents disclose bearings having perforated backing members to which a low friction material is attached.

| Inventor | U.S. Pat. No. |
| --- | --- |
| Stott | 2,459,598 |
| Cotchett | 2,622,949 |
| Terhorst | 2,989,355 |
| Prior | 3,252,346 |
| Hentschel | 3,881,791 |

U.S. Pat. Nos. 3,268,281 (Miller), 2,380,715 (Aker), and 2,310,923 (Bean) also relate to shaped bearings.

In U.S. Pat. No. 3,033,623 (Thomson), mentioned above, a bearing is made by attaching a sheet of low friction synthetic plastic material to perforated metal backing. A cylindrical bearing is then formed by rolling the sheet into the desired shape. In U.S. Pat. No. 3,711,166 (Wayson), mentioned above, a fabricated sheet of Teflon rests on a plate that has alternating depressed and raised areas.

A disadvantage of the prior art for making low friction bearings, other than simple flat bearings, is the frequent resort to specialized and complex, manual or automated methods such as molding and sintering for bonding low friction materials to backings and for forming the bearings.

Another disadvantage of some prior art for making low friction bearings is that the resulting bearing has a seam on the bearing face. For example, Pat. Nos. 3,881,791 (Hentschel) and 3,033,623 (Thomson), mentioned above, disclose bearings cylindrical in shape which have seams. U.S. Pat. No. 3,848,306 (Morse) discloses a method for making a cylindrical bearing in which a flat layer of plastic and a layer of perforated metal are bonded together to form a single sheet, which is then bent and swagged into a cylindrical tube. The resulting bearing has a seam. Such seams cause a discontinuity in an otherwise smooth bearing surface.

The various prior art manufacturing processes could be rendered more economical if the various steps for bonding low friction material to backing members and for forming the bearing backings could be reduced.

SUMMARY OF THE INVENTION

It is an object of this invention to provide a simple and efficient method for making low friction bearings.

It is also an object of this invention to provide a method for bonding low friction material to a metal backing for use as a low friction bearing.

It is yet another object of this invention to provide a method for making low friction bearings without seams.

A further object of this invention is to provide long lasting low friction bearings with curved low friction surfaces.

Another object of this invention is to provide low friction bearings with low friction surfaces that are smooth and without seams.

Yet another object of this invention is to provide low friction bearings with curved low friction surfaces permanently affixed to seamless, rigid backing members.

Still another object of the present invention is the provision of a fabric bearing where the need for adhesives is reduced or eliminated.

It is an additional object to provide an efficient and effective apparatus for fabricating fabric bearings having metal backings.

Other objects will be apparent to those skilled in the art to which the invention pertains from the description to follow and from the appended claims.

Shaped low friction bearings are made according to the invention from low friction fabric and sheet metal by a process in which the fabric and the metal are simultaneously drawn through a die to form the bearing, and a mechanical bond between the fabric and metal is achieved with a pressing operation.

BRIEF DESCRIPTION OF THE DRAWINGS

FIG. 1 is a perspective view of a low friction cylindrical bearing with collar produced in accordance with the invention.

FIG. 2 is an enlarged sectional view of a sheet of low friction fabric on a perforated metal sheet in a preliminary stage of producing bearings pursuant to the invention.

FIG. 3 is a schematic diagram showing the steps of making a low friction bearing according to the invention.

FIG. 4 is an enlarged sectional view of a slug being transferred between the blanking and drawing steps of a preferred embodiment of the invention.

FIG. 5 is a sectional view showing the drawing step for producing a bearing of the type shown in FIG. 1.

FIG. 7 shows in perspective a cylindrical low friction bearing made according to the invention.

FIG. 8 is a detailed, cross-sectional view of apparatus carrying out the drawing step of a preferred embodiment for making a cup-shaped low friction bearing.

DESCRIPTION OF THE PREFERRED EMBODIMENTS

Figures 6, 9:
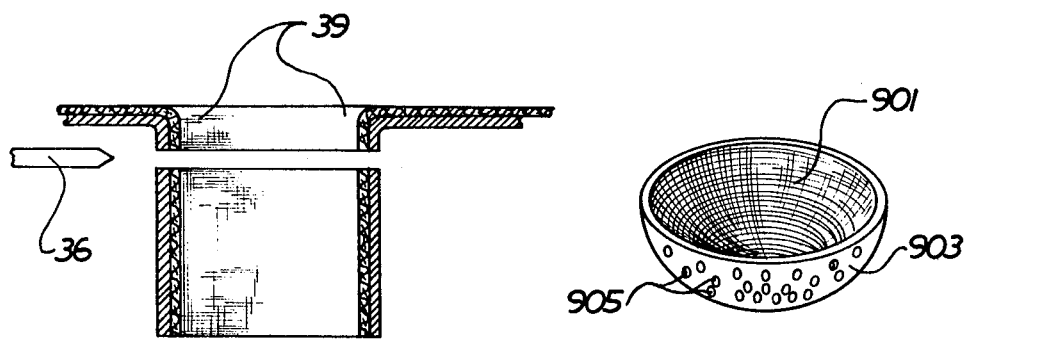
FIG. 6 shows the trimming of a cylindrical low friction bearing during a finishing step of the invention.
FIG. 9 illustrates in perspective a hemispherical low friction bearing made according to the invention.

This invention concerns shaped low friction bearings which have metal backings and have low friction fabric for the bearing face. By "shaped" is meant a bearing that is not flat. Examples of such bearings are bearings having cylindrical or hemispherical shapes. Bearings according to the invention have curved, seamless, low friction surfaces and rigid backing members. Preferably the low friction surface is a fabric containing Teflon and the backing is a perforated sheet of steel.

An embodiment of the inventive process for making bearings according to the invention includes the steps of: feeding a sheet of low friction fabric and perforated metal sheet together into a punching apparatus; blanking a slug out of the two sheets with a single actuation of the blanking punch; forming the low friction bearing from the slug by drawing it through a die shaped to correspond to the desired shape of the bearing. The forming step comprises drawing the fabric and metal into a bearing of the desired shape by simultaneously passing an appropriate pressing member such as a drawing punch into both the fabric and metal and against a drawing die which has an inner configuration corresponding to the desired shape of the bearing. The fabric is urged against the metal and the metal is urged against the die to assume the configuration of the die face thereof, and resulting bearing has a smooth inner surface free of seams. The fabric and metal are driven together with force sufficient to bond them together as well as shape them into the desired configuration. In another embodiment the blanking and the drawing are done at the same time by one punch and die. Subsequent steps may include such finishing steps as trimming, polishing, curing and heat treatment. The process is such that the bearing can be made by using a conventional punch press. A few bearing configurations are discussed herein, but it should be understood that there are a large variety of bearing configurations achievable according to the invention.

A related process for making bearings in which the metal backing member is itself used to draw the low friction fabric into the desired shape is disclosed in this inventor's application Ser. No. 132,263 filed contemporaneously herewith, for a Hot Drawn Low Friction Bearing. The making of molded bearings from a composite of low friction and bondable materials is disclosed in this inventor's application Ser. No. 132,267 also filed contemporaneously herewith for a Low Friction Moldable Bearing and Composition.

The low friction fabric used in the preferred embodiment described below preferably comprises fluorinated hydrocarbons such as fluorinated polyethylene derivatives, for example polytetrafluoroethylene (PTFE), or any other material which has the desirable low friction characteristics, such as polychlorotrifluoro ethylene, polyvinylidene fluoride, and the like. Preferably, the low friction material is Teflon (trademark of DuPont for PTFE material). The low friction fabric may be made entirely of low friction material, or it may include bondable materials. By "bondable" is meant the ability to bond to itself and to other substances. Such bondable materials are useful because of the well known difficulty of bonding Teflon. Bondable materials include Dacron (trademark of DuPont for polyester fiber), cotton, acrylic, methacrylic, nylon, Nomex (trademark for DuPont for polyamide fiber), and the like. The addition of bondable material adds strength and wear resistance as well as bondability to the fabric, but it can increase friction of the fabric. The preferred mixture of bondable material and low friction material, and even the use of no bondable material, depends on the characteristics desired in the bearing.

The low friction fabric is preferably either woven or knit. The composition of the low friction fabric may be varied in a number of ways. For example, it may consist of threads of entirely low friction material. Or the low friction fabric may contain a mixture of kinds of threads, each kind of thread consisting of low friction material or bondable material. Or the low friction fabric may have threads that include both low friction material and bondable material. Some or all of the threads of the low friction fabric may be made up of bondable low friction yarn. Such yarn includes both filaments of low friction material and filaments of bondable material. The bondable low friction yarn is made by twisting the various kinds of filaments together into a single thread which, therefore, has both low friction properties and the capability of being bonded together and to the metal backing. Similar advantages can be obtained by braiding together filaments of both low friction material and bondable material to form a bondable low friction braided thread.

In its preferred form the low friction fabric is treated with a bonding resin which allows the fabric to bond to itself, making a more uniform fabric, and also bond to the metal backing. Bonding resins may be applied to the low friction fabric by immersion, spraying, painting, or the like. In its most preferred form the resin is applied to only one side of the fabric, such as by using rollers to apply the resin. As explained below, having resin on only one side of the fabric facilitates high volume processing.

The resin may be a cured thermosetting resin. Such resins may be urea formaldehyde, urethane, melamine-formaldehyde, and the like. The preferred resin is phenol-formaldehyde. The resin is applied while in the A-stage; that is, the resin is dissolved or in solution in a solvent which acts as a carrier or vehicle. After the fabric is treated with the resin, it is cured to the resin's B-stage; that is, the solvent is driven out and the resin alone remains in an essentially non-tacky yet incompletely cured condition. In other words, in the B-stage the resin is in a solidified yet thermoplastic state with substantially all the solvent removed. A process for impregnating thread or yarn before knitting or weaving is described in U.S. Pat. No. 3,947,611 to this inventor. However, for the purposes of this invention it is preferable to apply the resin after the fabric is woven, so that the resin may be applied to only one side of the fabric.

A thermoplastic resin may also be employed, provided that the temperature at which the resin has a tendency to flow is substantially higher than the operating temperature of the resulting low friction bearing. In the case of this class of resins, if impregnation is carried out with the resin in a solvent solution, the solvent should be removed before use.

If the bearing is to be subjected to high temperature, it may be desirable to employ an appropriate high temperature resin. Such resins are discussed in *Machine Design*, May 15, 1969 issue, pages 174-178. Such resins or adhesives are epoxies, epoxy phenolic, amide imides, polyimides, polybenzimidazole, polycarboranesiloxane, and the like. A preferred high temperature resin is Pyralin (trademark of DuPont for a polyimide).

The bonding resin, whether a thermoset or thermoplastic resin, may be characterized as being in a "solidified yet thermoplastic" state; that is, it has the property of softening or fusing when heated and of hardening again when cooled. This is intended to characterize a thermosetting resin which has been cured, as well as a true thermoplastic resin which may be softened by heating.

The metal backing of the bearing is advantageously made from a sheet of malleable metal, such as steel. Steel is preferred over softer metals because it results in a rigid, long wearing bearing. Furthermore, steel is also preferred because it can be hardened by conventional techniques. Bearings with hardened steel backings are useful for high stress applications such as automobile ball joints. Preferably the metal is perforated. The shape and arrangement of the perforations is not critical, but there should be a large number of perforations thereby giving relatively uniform coverage over the entire sheet.

After the sheets of low friction fabric and the metal sheets have been prepared, they are most easily stored by winding them into rolls which are later unrolled for feeding into a punch press when the bearings are made.

Figures 10, 11, 12:
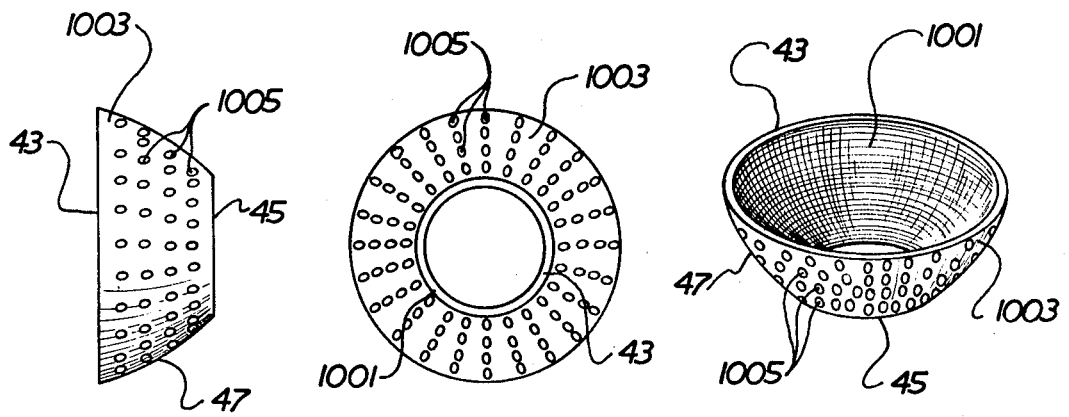
FIGS. 10-12 are side, end, and perspective views, respectively, of a shaped low friction bearing made according to the invention.

Referring to the drawings, FIGS. 1, 7, 9, 10, 11, and 12 show various configurations of low friction bearings made according to the invention. Each configuration has low friction fabric 1, 701, 901, 1001 for the bearing surface and a metal backing or support 3, 703, 903, 1003 with numerous perforations 5, 705, 905, 1005. For example, FIG. 1 is a low friction bearing which is basically a cylinder in shape, but with an outwardly facing flange or collar 31 about one end. The bearings shown in FIGS. 1 and 7 are often referred to as journal bearings, and are often used in joints to surround rotating shafts. The bearing shown in FIGS. 10-12 is adaptable for use in automobile ball joints.

FIG. 3 is a schematic diagram illustrating a preferred set of steps for producing the bearing of FIG. 1. The first step comprises simultaneously feeding a sheet of low friction fabric 7 and a perforated metal sheet 9 into a blanking apparatus 15, so that the fabric overlays the metal or vice versa, but preferably the fabric is on top as explained below. Preferably the sheets of fabric and metal are juxtaposed, that is, placed in close spatial relationship to each other and preferably touching each other. It should be understood that other layers may be interposed between the fabric and metal, but preferably such other layers are not used. The sheets of fabric and metal are easily stored in separate rolls 17, 19 which are unrolled as the sheets are fed into the blanking apparatus.

FIG. 2 is a cross section which better shows a sheet of low friction fabric 7 on top of a perforated metal sheet 9. The low friction fabric is woven and has a fill of Teflon threads 11 and warp of bondable low friction yarn 13. A variety of fabric configurations can be devised by one skilled in the art. The configuration in FIG. 2 has Teflon threads 11 woven in a ratio of three to one with bondable yarn 13; that is, each fill thread of Teflon goes over three warp threads of bondable yarn and under one warp thread of bondable yarn. Also shown are the perforations 21 in the metal sheet. A preferred form of fabric consists entirely of woven Teflon filaments with resin applied only to the side which contacts the metal sheet so that the resin can aid bonding of the fabric to the metal. Preferably the fabric is positioned on top to be engaged by the punch so as to reduce friction as the punch is used. Therefore, no resin is wanted or desired on the side of the fabric which contacts the punch. Indeed, it is preferred to have no resin on that side because the resin will tend to accumulate on the punch. When the bearings are made at high speeds in great volume, accumulation of resin on the punch could cause the fabric to stick to the punch and even jam the press.

In FIG. 3 the step of blanking a disc-shaped slug 23 from the two sheets is shown. A piercing punch 25 punches through both sheets 7 and 9 and into a blanking die 27. FIG. 4 shows the disc-shaped slug 23 in more detail. Some of the low friction fabric 7 has been forced into the perforations 21 in the metal backing by the action of the piercing punch.

In the next step of the process depicted in FIG. 3, the disc-shaped slug 23 is formed into a top hat-shaped low friction bearing 32 by passing a drawing punch 29 through the disc-shaped slug and a drawing die 33. FIG. 5 shows this in more detail. The drawing die comprises a die insert 37 set in a die block 39. The drawing punch initially contacts the low friction fabric 7 on the disc-shaped slug. It then deforms the slug and eventually pushes all the way through the slug. A hold down means 41 holds the slug in place during the forming operation. The low friction fabric 7 is positioned on the top of the metal so as to ease the forming operation by reducing friction (since the fabric is a low friction fabric) between the punch and the slug.

If the metal backing is perforated, the perforations are deformed during the forming of the bearing as the bearing is shaped, so that, for example, perforations which are circular at the start become oblong as the metal is stretched. The low friction fabric is forced to further penetrate into the perforation in the metal backing sheet. While all the steps in producing the low friction bearing may be performed by cold drawing, heat and pressure may be employed to aid penetration by the low friction fabric. The perforations not only act to help bind the fabric to the metal, but they also act to register the fabric against the metal during forming so that the fabric does not bunch up.

It should be noted that it is not necessary that the blanking step precede the drawing of the bearing. One or more or even all of the drawing operations may be completed before the bearing is cut from the rest of the fabric and metal. Furthermore, as explained below, the blanking and drawing operations can be accomplished in a single step.

The preferred final step is finishing the bearing. FIG. 3 shows as finishing step, trimming the flange of low friction bearing 32 by the use of cutting tools 35 to remove extraneous portions of the bearing, that is, the unwanted excess left from forming. Such trimming can also be done by grinding or wiping. Other operations may be included in the finishing step, such as heat treatment for the purpose of hardening the backing or polishing.

If the resin is the type which must be heat-cured, the finishing step includes heat curing the bondable resin. As the bearing is heated, the bonding resin softens, and it coalesces to form a continuous matrix about and through the bondable low friction fabric. In the case of a thermosetting resin, heat and pressure required for final curing cause the resin to first soften and coalesce into a continuous matrix, and as the polymerization proceeds, the resin assumes its normal solidified cross-linked character. In the case of a thermoplastic resin, heat and pressure will effect a softening coalescence of the threads to a continuous matrix, which upon cooling solidifies and effects the bonding of the threads to each other. This heat treatment of the resin can also be accomplished during the forming of the bearing by slowly drawing the fabric and metal rising a heated punch and die. However, it is generally simpler and more satisfactory to heat cure after formation, such as by using a heated die as a finishing step.

The aforementioned bonding resins also act to bond the fabric to the metal backing. The combination of urging the low friction surface against the backing and using the aforementioned resin makes a durable bearing. Optionally, other bonding resins and adhesives may be used for supplemental bonding of the low friction material to the metal backing. Epoxies, phenolic cements, and the like are among the various substances known to persons skilled in the art which may be used to help bond the low friction material to the metal backing. However, when the bearing is made in the preferred form of Teflon as the low friction fabric and phenol-formaldehyde as the resin, supplemental bonding is unnecessary.

Preferably all the necessary operations are accomplished on a conventional punch press. Use of such a machine can provide the force required to bond and shape the fabric and metal. This permits a highly productive process without having to invest in new and complex machines. The basic modifications required on most punch presses would be the use of proper punches and dies. The slug may be transferred between steps by means of moving belt, a transfer slide, transfer fingers, or the like. A mechanism such as transfer fingers are preferable as they maintain positive control over the pieces. Such transfer devices are well known in the art. The punch press may be manually operated or automated to increase efficiency. The various work steps could be incorporated in a multi-function machine wherein the various blanking, drawing, and finishing steps are performed in sequence with the feed of work pieces to the respective work stations, to effect an efficient and economical manufacturing operation.

Figure 13:
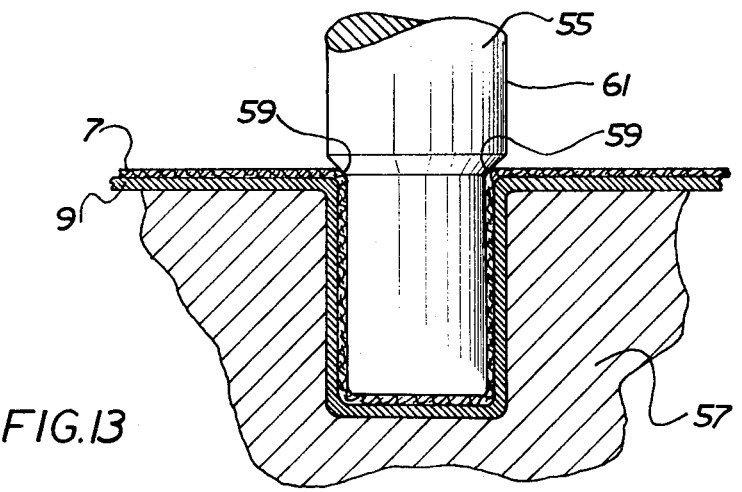
FIG. 13 shows a punch and die designed to make the bearing in a single drawing step according to the invention.

The bearing may be made by using a single punch and die. FIG. 13 illustrates the sheet of low friction fabric 7 and metal sheet 9 being fed into a punch 55 and die 57. The punch and die fit closely enough when the punch is at the bottom of its cycle to sever the fabric and metal as in a blanking operation. However, the bearing is formed while the punch passes into the sheets and die prior to reaching the bottom of its cycle. Punch 55 is provided with a shoulder 59 which defines the end of an enlarged punch section 61; shoulder 59 being disposed at the upper end of die 57 when the punch 55 is fully inserted into the die, so that the shoulder 59 severs the fabric 7 and metal sheet 9 at the end of the stroke of the punch.

Using the same steps and by making small modifications in the above-mentioned operations, bearings of various shapes, sizes, and configurations can be fabricated according to the invention. For example, FIG. 7 shows a cylindrical low friction bearing. A bearing of this shape can be made by the same process as that for making flanged low friction bearing 32, except that in the finishing stage the outward facing flange on the top hat low friction bearing is removed. The outward facing flanges 39 are removed by cutting means 36 in FIG. 6. Such trimming can also be done by wiping or grinding the extraneous portions from the bearing. Such a cylindrical low friction bearing may also be made during the forming step by drawing the disc-shaped slug through the drawing die to form a bearing without outwardly facing flanges. The bearing may be finished by trimming, polishing, heat treatment, or the like.

A cup-shaped low friction bearing may be formed by slightly modifying the drawing die used in the forming step. FIG. 8 illustrates the forming of a cup-shaped low friction bearing using a die 49 with a cup-shaped inner surface including a closed bottom 53. The slug 23 is drawn into the die without pushing through the slug or die. A bearing corresponding to the inner shape of the die is thereby formed. Ejection means, such as knockout pins 51, can be used to remove the low friction bearing after the drawing process by pushing the bearing out of the die.

Similarly, a hemispheric low friction bearing, such as shown in FIG. 9, may be made by using a drawing die whose inner surface is in the shape of a section of a sphere. If an outward facing flange is left after the forming step, the flange may be removed by trimming or wiping at the finishing step.

Low friction bearings may be made in special shapes by providing the drawing die with an appropriately configured inner surface, or by drawing the bearing through several different dies. For example, FIGS. 10-12 show a low friction bearing in a special shape with two open ends, one end 43 being larger than the other end 45. Its shape is generally that of a frustrum of a cone, but with the outer surface 47 being convexly curved. A bearing in this shape has applications in ball joints of automobiles and the like.

For some shapes, especially somewhat complex configurations, more than one die may be used in the forming operation. Such progressive drawing may even be desirable for relatively simple shapes, especially if a rather deep draw is required to make the bearing. For example, a flanged low friction bearing may be formed by first using a cup-shaped drawing die such as illustrated in FIG. 8. Thereafter, as a second operation in the forming step, the bottom is punched out in a second die as illustrated in FIG. 5.

A particularly preferred apparatus and process according to the invention for producing bearings of the invention is shown in FIGS. 14-18, and the workpieces at various production stages of this apparatus and process are shown in FIGS. 19-24. Referring to FIGS. 14-18, a multi-station die assembly 1100 is shown which comprises a lower die fixture 1102 and an upper die fixture 1104. As indicated by arrow A in FIG. 14, upper die fixture 1104 is movable reciprocally in the vertical direction relative to the stationary lower die fixture 1102. Die assembly 1100 has a series of work stations designated in FIGS. 14-17 by the numerals I-XIII.

Die assembly 1100 can be used in conjunction with any of a variety of stamping presses known to those skilled in the art, whose capacity would depend on the size and quantity of bearings to be manufactured. Accordingly, die assembly 1100 is shown seated on the bed B of a press P shown in schematic form in FIG. 18. Lower die fixture 1102 is shown in detail in FIGS. 15 and 16, and comprises a plate or die support member 1106 intended to rest on the bed of a press, and a die holder 1107, in which are disposed a plurality of die inserts. A set of upwardly extending guide bushings 1108, 1110 and 1112 are attached to support member 1106, and are dimensioned to receive in sliding engagement guide posts 1114, 1116 and 1118 depending from upper die fixture 1104 (FIG. 17) to control the accurate reciprocal, vertical movement of upper die fixture 1104. The cylindrical surfaces of guide posts 1114, 1116 and 1118 are covered with bearings 1119 to reduce the friction between the guide posts and their associated guide bushings. The downward travel of upper die fixture 1104 is limited by the upper surfaces of stop posts or die stops 1120, 1122, 1124 and 1126 extending vertically upwardly from support member 1106.

Seated on die holder 1107 are a pair of opposed, spaced guide plates 1128, 1130. Each plate is in the form of an inverted "L". Die inserts 1136 and 1138 are fixed in appropriately configured recesses in die holder 1107, at stations I and II. These inserts have small bores 1139 for receiving piercing pins to perforate the workpiece. Bores 1139 at stations I and II are offset, so that when a workpiece is to be pierced at successive stations, new perforations are pierced into the workpiece at station II. Stations III and IV have no die inserts and are idle, although room is available for die inserts to be provided there.

Figure 14:
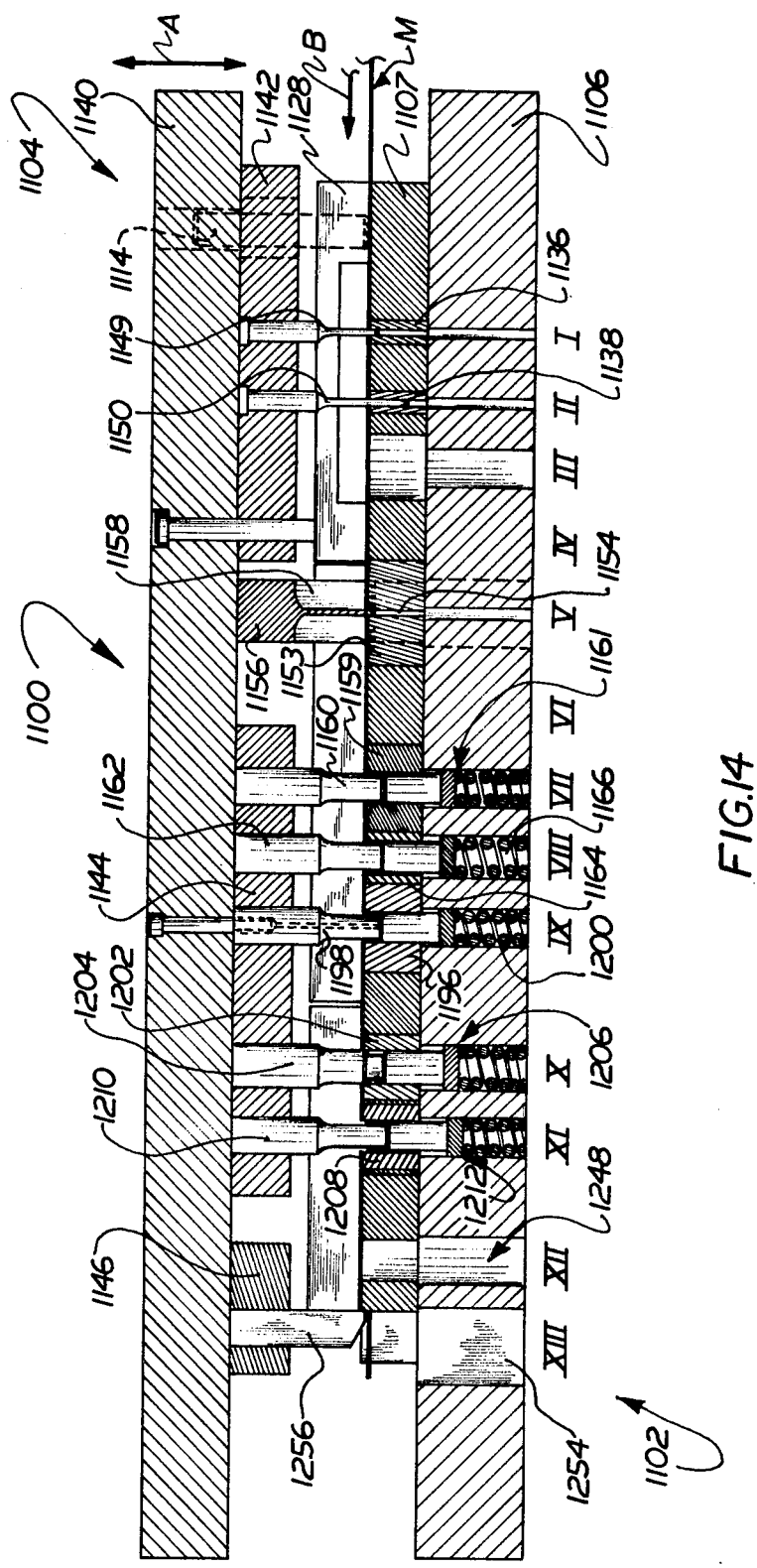
FIG. 14 is a cross-sectional view of a preferred apparatus for fabricating cup-shaped fabric bearings having metal backings.
Figure 17:
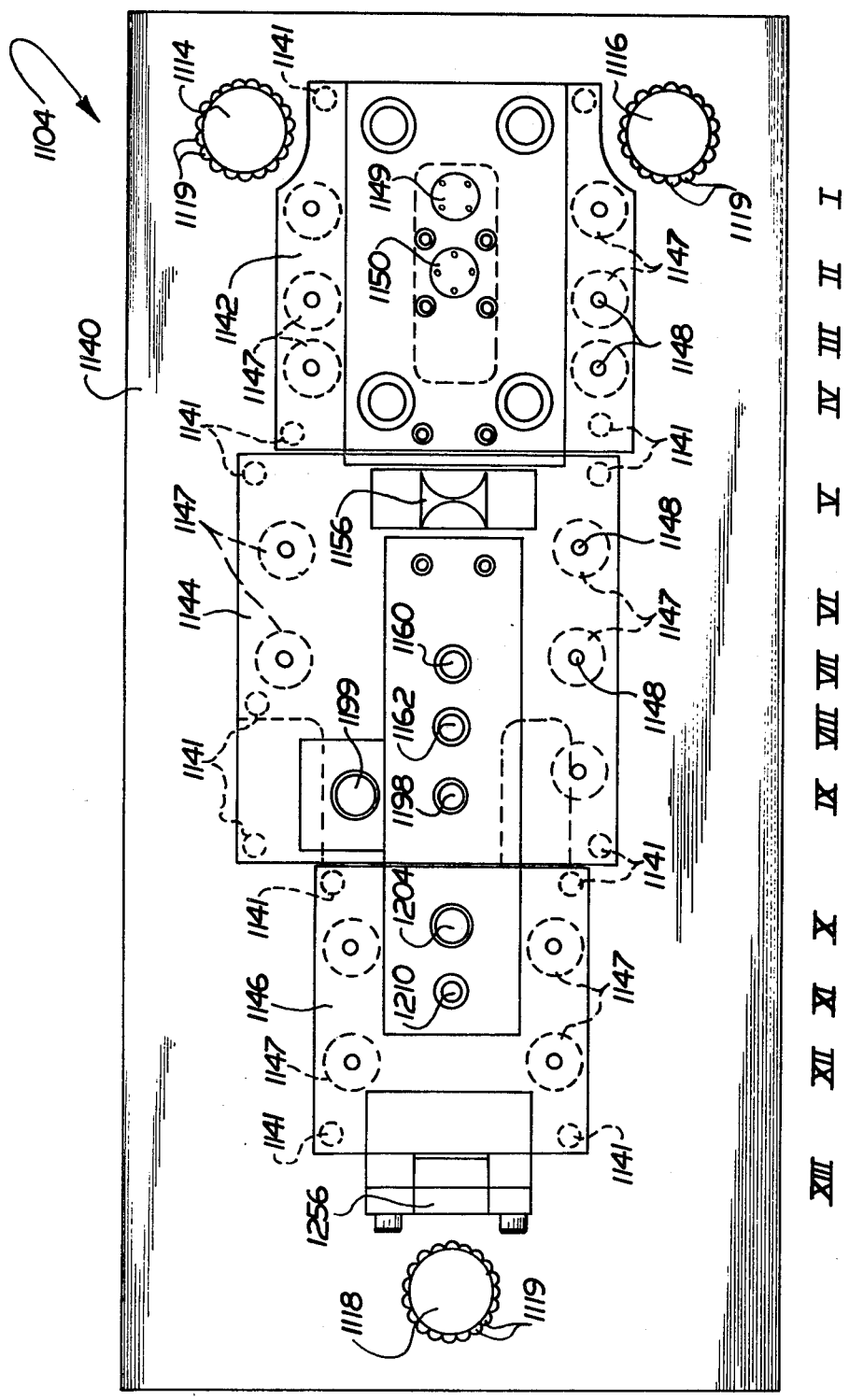
FIG. 17 is a plan view of the upper die fixture of the die assembly shown in FIG. 14.

Referring to FIGS. 14 and 17, upper die fixtures 1104 has an upper support member 1140 opposite support member 1106, and attached thereto by means of bolts 1141 are a set of aligned upper die blocks 1142, 1144 and 1146. A plurality of shock absorbing coil springs 1147, secured between the upper die blocks and upper support member 1140 by bolts 1148, absorb shock imparted to the upper die blocks. A set of piercing die punches 1149, 1150, each having four piercing pins 1152 dimensioned and aligned with the bores of die inserts 1136, 1138, respectively, are attached in upper die block 1142 at work stations I and II. Work stations III and IV are idle and have no die punches as noted earlier regarding the corresponding portions of lower die fixture 1102. A die insert 1153 having a recess 1154 is disposed in die block 1107 (FIGS. 14, 15), the recess being configured to receive in sliding engagement a blanking punch 1156 attached to and depending from upper support member 1140, at station V. Punch 1156 and recess 1154 have corresponding generally tapered and curved cutting surfaces 1157, 1158 for cutting hour glass shaped blanks from the workpiece.

Figure 15:
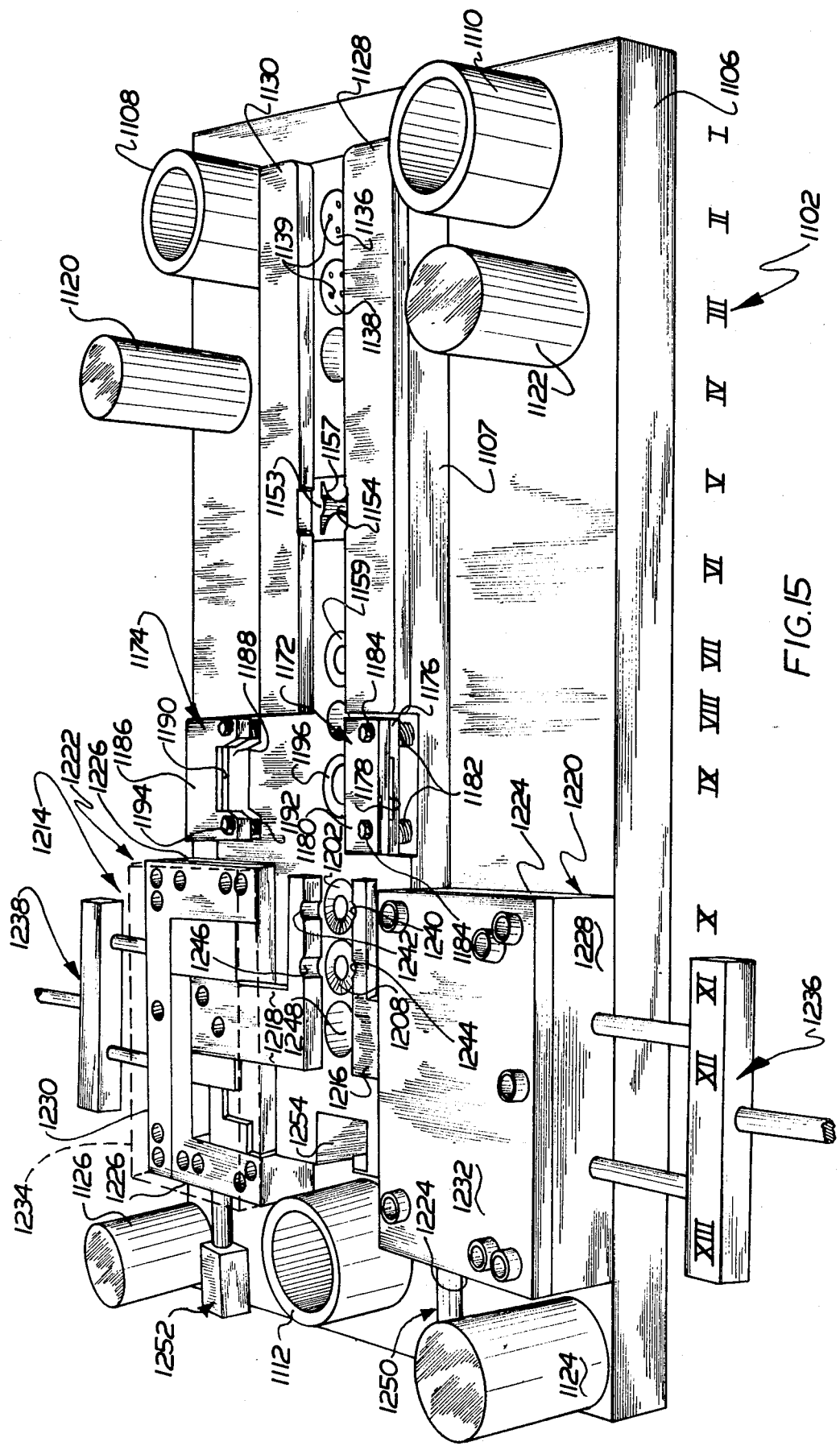
FIGS. 15 and 16 are perspective and plan views, respectively, of the lower die fixture of the die assembly shown in FIG. 14.
Figure 16:
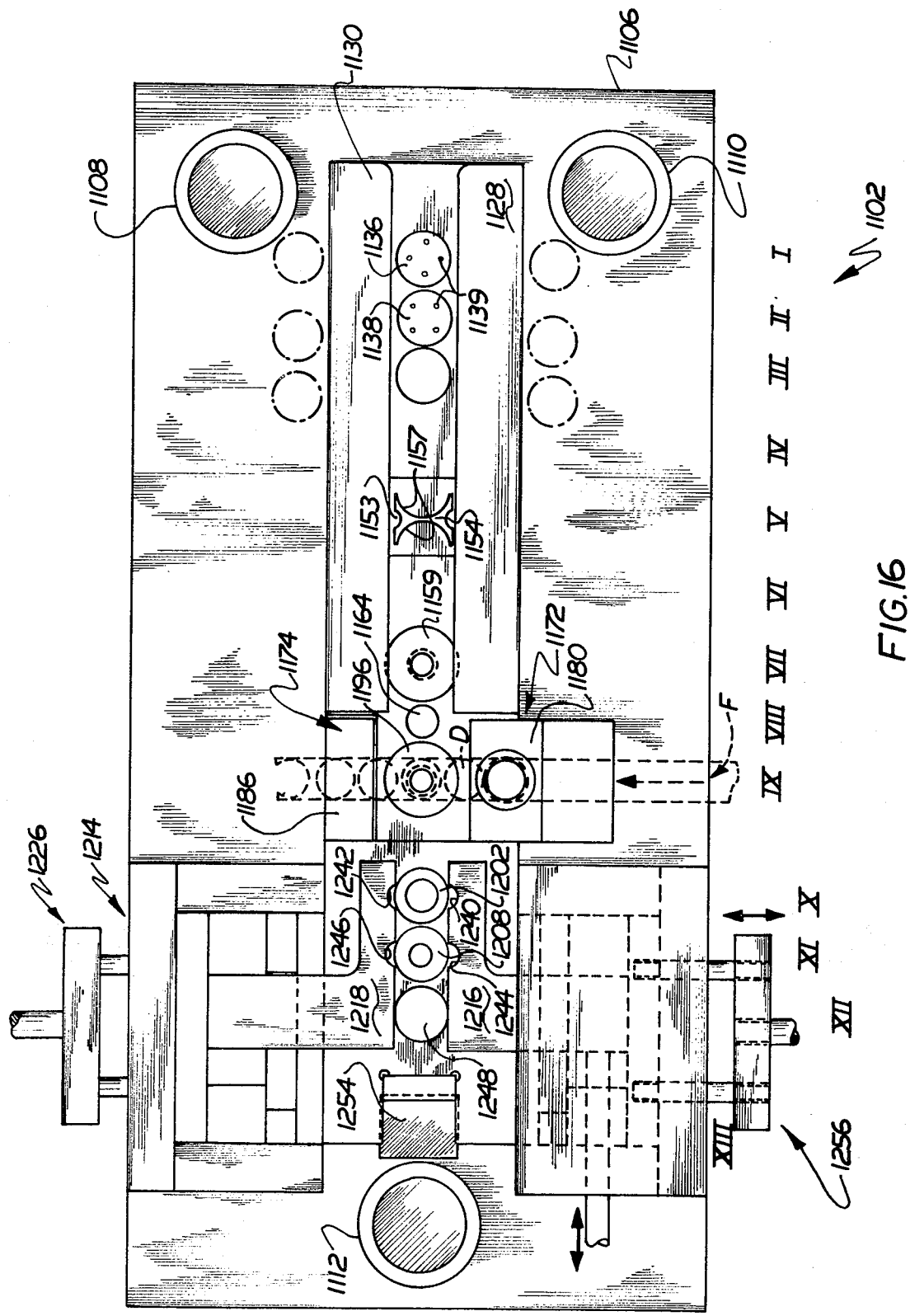

Continuing leftward in FIGS. 14-16, following a vacant or idle station VI, a die insert 1159 is seated in die holder 1107, and is located to receive the free end of a draw punch 1160 attached to upper support member 1140 by upper die block 1144. A spring loaded cushioning assembly 1161 absorbs the impact of punch 1160. A cup shaped article is formed at station VII, and the article is further modified at station VIII where a draw punch 1162 restrikes the workpiece into an aligned die insert 1164 to give the cup shaped workpiece its final dimensions. Punch 1162 is attached to upper support plate 1140 by die block 1144. Another spring loaded cushioning assembly 1166 absorbs the shock of punch 1162.

The only workpiece at stations I-VIII is the sheet stock M. Bearing fabric F, coated with resin as described previously, is introduced into die assembly 1100 at work station IX, where it is fed transversely relative to sheet stock M through opposite guide assemblies 1172 and 1174. Guide assembly 1172 includes a lower rectangular guide plate 1176 having a slot 1178 dimensioned to receive a strip of bearing fabric F, and a flat upper rectangular guide plate 1180 whose lower surface defines the top of slot 1178. Plates 1176 and 1180 are seated on a set of four shock absorbing coil springs 1182, and are attached to die block assembly 1107 by bolts 1184 extending through aligned bolt holes in the plates and along the axes of springs 1182. Similarly, guide assembly 1174 comprises upper and lower guide plates 1186, 1188, which define a fabric guide slot 1190, and which are seated on four shock absorbing coil springs 1192 by means of bolts 1194 securing the assembly to unit 1107. Guide plates 1186, 1188 are not rectangular, but rather have spaced legs extending towards guide assembly 1172 for supporting the edge of the fabric strip F after blanks have been removed.

A die insert 1196 is disposed between guide assemblies 1172 and 1174, and in line with the die inserts at the preceding work stations. Die insert 1196 has a recess for receiving the end portion of a second die punch 1198 depending from die fixture 1104, to which it is secured by die block 1144. Upper die fixture 1104 further includes a depending fabric blanking die punch 1199 (FIG. 17) for blanking fabric discs D which are subsequently pushed into the cup shaped workpieces drawn from strip stock M by die members 1198 and 1196. Spring loaded cushioning assembly 1200 absorbs the impact of punch 1198.

A trimming operation is performed on the combined metal and fabric workpiece at station X. A trimming die insert 1202 is accordingly located in die holder 1107, whose bore is aligned with a trimming punch 1204 extending downwardly from upper die fixture 1104, and secured in place by die block 1146. A spring loaded cushioning assembly 1206 cushions the impact of punch 1204.

To the left of station X are a final draw and wiping station XI. A draw and wiping die insert 1208 are disposed in lower die fixture 1102 next to die insert 1202. The bore of die 1208 is co-axial with a draw punch 1210 depending from the upper die fixture and secured there by die block 1146, and these components co-operate to final draw the workpiece and to wipe it to remove the edge flange. A spring loaded cushioning assembly 1212 absorbs the shock of the punch at station XI.

A transfer assembly 1214 (FIGS. 15 and 16) moves workpieces from station X to station XI and from station XI to a discharge chute at station XII. Transfer assembly 1214 includes carrier bars 1216 and 1218. Carrier bars 1216, 1218 are reciprocable towards and away from each other in a path perpendicular to the path of the workpieces along the length of the die assembly, and in a path parallel with the workpiece path. Bars 1216, 1218 extend from housings 1220 and 1222, respectively. Housings 1220, 1222 include side walls 1224 and 1226, end walls 1228 and 1230, and top walls 1232 and 1234, the latter being shown by dotted lines to reveal the interior of housing 1220. The movement of bars 1216, 1218 towards and away from each other is effected by air actuated piston rod assemblies 1236 and 1238, which extend through appropriate openings in end walls 1228 and 1230 for connection to the respective carrier bars. Carrier bars 1216 and 1218 have cooperating pairs of curved gripping surfaces 1240, 1242 and 1244, 1246. These gripping surfaces simultaneously grip workpieces at stations X and XI when the bars are moved towards each other, and transport them to work station XI and to a discharge orifice or orifice 1248 at station XII, respectively, when bars 1216, 1218 move linearly in the direction of bushings 1112. The linear movement of the carrier bars parallel to the path of the workpieces is effected by air actuated piston assemblies 1250 and 1252 which are connected, respectively, to carrier bars 1216 and 1218. The actuation of the piston assemblies 1236 and 1238, and 1250 and 1252 in the workpiece gripping and transfer directions and in the return directions, is accomplished in coordination with and by the transfer mechanism of the press through appropriate connections (which are not shown).

A second orifice 1254 is located at work station XIII in lower die fixture 1102, for receiving the skeletal scrap material severed in sequence by a blade 1256 attached to upper die fixture 1104 by die block 1146.

Figures 18, 19:
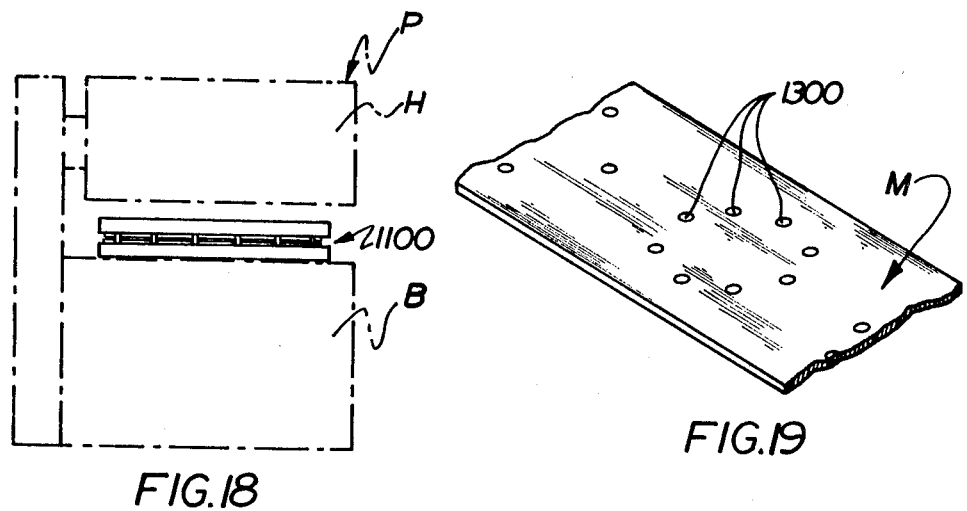
FIG. 18 is a schematic drawing of die assembly of FIG. 14 on a press.
FIGS. 19-24 show work pieces at various work stations of the die assembly of FIG. 14.
Figures 20, 21:
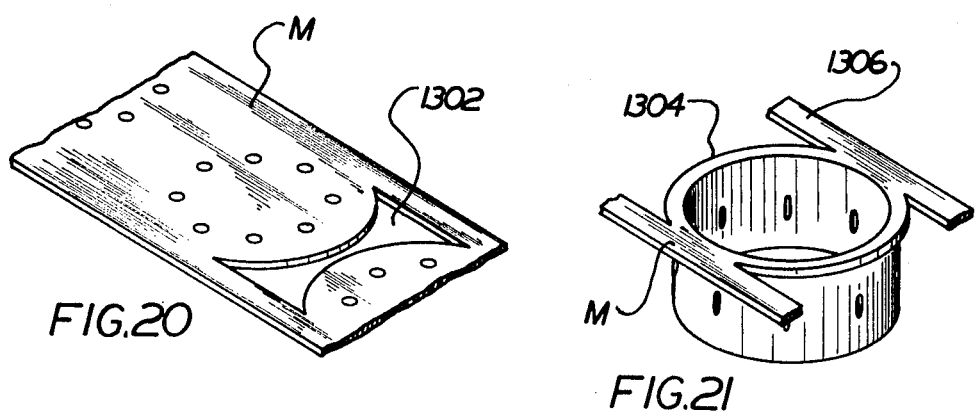
Figures 22, 23, 24:
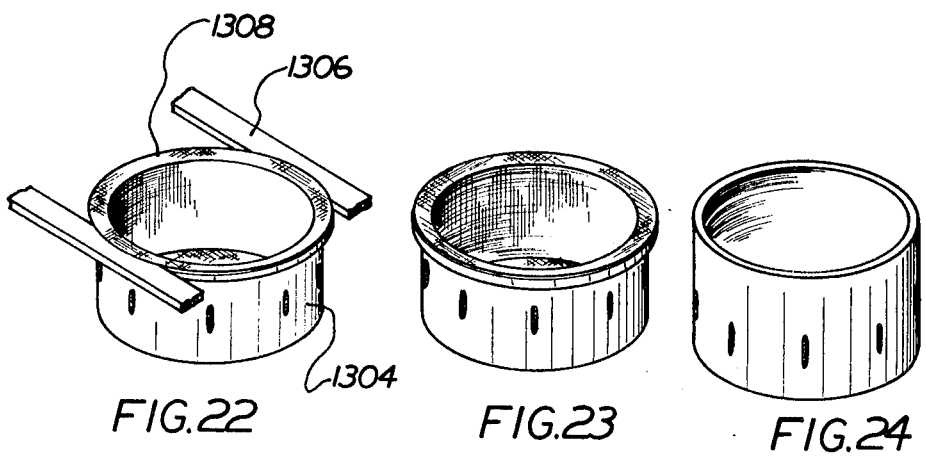

In the operation of die assembly 1100, sheet metal stock M is drawn from a supply reel and into the die assembly as indicated by the arrow B in FIG. 14. The workpiece M is indexed in sequence through stations I and II, where die inserts and die punches 1136, 1149, and 1138, 1150 punch holes 1300 in a circular pattern in the workpiece as shown in FIG. 19. The workpiece is next transferred through the idle stations III and IV. At station V, hour glass shaped cut-outs are blanked from strip M to leave openings 1302 between the respective bearing blanks. Strip M is transported past idle station VI, to stations VII and VIII where the metal blank is drawn to its final dimensions in a two step process. The blank after station VIII is shown in FIG. 21. At station IX, fabric blanks are pushed into metal blank 1304 to yield the composite blank of FIG. 22. Then, trimmed blanks as shown in FIG. 23 are made at station X, and the upper flange is wiped at station XI. The bearing blank is cut from skeletal transfer strip 1306 at station XII, and the part is drawn and wiped to its final dimension by die members 1210 and 1208. The resulting product is shown in FIG. 24.

Die assembly 1100 is designed as an automated apparatus for rapidly producing bearings as the strip stock and bearing fabric are indexed through the die assembly by a transfer assembly. Referring to FIGS. 14 and 18, the die is positioned on the bed B of a press P prior to operation, and the metal stock M and fabric F are threaded into the die to an extent sufficient to enable the commencement of operation of the transfer or indexing mechanisms. The power head H of the press sequentially drives upper die fixture 1104 towards lower die 1102, forcing the various die punches and cutting tools depending from upper die fixture 1104 into their respective receptacles in lower die fixtures 1102, as well as actuating the transfer mechanism with each return stroke of head H. The net result of this operation is the indexing the work pieces through the die assembly and the effecting of sequential forming and cutting process steps to progressively manufacture the fabric bearings. The various die punches force the workpieces against knock-out pins, which urge the pieces out of the die recesses so that they can be indexed to the next work station.

The preferred embodiments described herein fulfill the objects of the invention. Processes and apparatus are disclosed for making low friction bearings from a sheet of low friction fabric and a metal sheet. The bearings can be made by using conventional punch press machines. Shaped low friction bearings with curved bearing surfaces and rigid backings are disclosed. Both the bearing surfaces and backings are seamless. Bearings made according to the invention have particularly strong bonding between the low friction surface and the rigid backing. Bearings are discribed herein as being "perforated", and it is preferred that such bearings actually have pierced metal backings; however, the term "perforated" doesn't require that the metal be pierced—it can for example be dimpled or embossed. A die assembly has been described which is efficient and effective in fabricating fabric bearings with metal backings.

The invention has been described in detail with particular reference to the perferred embodiments, but it will be understood that variations and modifications within the spirit and scope of the invention may occur to those skilled in the art to which the invention pertains.

I claim:

1. A process for producing an open-ended cylindrical low friction bearing with a low friction surface and a metal backing, comprising the simultaneous steps of:

urging a sheet of malleable metal against a die contoured to correspond to a desired shape for a backing of a shaped bearing by forcing a first pressing means contoured to correspond to said shape into said metal to stretch and shape said metal to form said backing;

urging a low friction fabric against said metal by forcing a second contoured pressing means into said fabric to stretch and shape said fabric into a low friction surface of said bearing, a portion of said second pressing means passing entirely through the fabric and the metal; and pressing said fabric and said metal together with force sufficient to bond said fabric and said metal together across their interface.

2. The process of claim 1, wherein said first pressing means and said second pressing means are the same and said steps of urging said metal and urging said fabric are simultaneous.

3. A process for producing a shaped low friction bearing with a low friction surface and a metal backing, comprising the simultaneous steps of:
   urging a sheet of malleable metal against a die contoured to correspond to a desired shape for a backing of a shaped bearing by forcing a first pressing means contoured to correspond to said shape into said metal to stretch and shape said metal to form said backing;
   urging a low friction fabric against said metal by forcing a second contoured pressing means into said fabric to stretch and shape said fabric into a low friction surface of said bearing, and severing a portion of the fabric and the metal by passing a portion of the pressing means entirely through the fabric and metal; and
   pressing said fabric and said metal together with force sufficient to bond said fabric and said metal together across their interface.

4. The process of claim 3, wherein said first pressing means and said second pressing means are the same and said steps of urging said metal and urging said fabric are simultaneous.

5. The process of claim 4, wherein said pressing step is simultaneous with said steps of urging said metal and urging said fabric.

6. The invention of claim 3 or 4, further comprising the step of perforating said metal sheet prior to said step of urging said metal.

7. The invention of claims 3 or 4, wherein the side of said low friction fabric which contacts said sheet of metal is impregnated with a thermoplastic bonding resin, and said process comprises the further step of subjecting said resin to sufficient heat to bond together the materials in contact with the resin.

8. The invention of claim 7, wherein said die is a heatable die, and said step of subjecting said resin to heat comprises heating said die to heat said resin sufficiently to bond together the materials in contact with the resin.

9. The invention of claim 7, wherein only one side of said low friction fabric is coated with said resin and wherein the side of said fabric coated with resin is placed against said metal during said step of urging said fabric.

10. The invention of claims 3 or 4, further comprising the step of removing extraneous portions of fabric and metal.

11. The invention of claims 3 or 4, wherein said resin is heat curable, and further comprising the step of final heat curing said resin.

12. An open-ended cylindrical low friction bearing prepared by a drawing process using a die contoured to correspond to a desired shape for the bearing and a corresponding contoured pressing means, comprising the steps of:
    juxtaposing a sheet of malleable metal and a low friction fabric treated with a bonding resin;
    urging the pressing means against the fabric and the metal to urge the fabric and the metal against each other and against the die, and passing a portion of the pressing means entirely through the fabric and the metal, the fabric and the metal being bonded together across their interface and being shaped into the desired shape.

13. The invention of claim 12, further comprising the step of perforating said metal prior to said urging step.

14. A shaped low friction bearing prepared by a drawing process using a die contoured to correspond to a desired shape for the bearing and a corresponding contoured pressing means, comprising the steps of:
    juxtaposing a sheet of malleable metal and a low friction fabric treated with a bonding resin;
    urging the pressing means against the fabric and the metal to urge the fabric and the metal against each other and against the die, passing a portion of the pressing means through the fabric and the metal and severing a portion of the fabric and the metal from the rest of the fabric and the metal, the fabric and the metal being bonded together across their interface and being shaped into the desired shape.

15. The invention of claim 14, further comprising the step of perforating said metal prior to said urging step.

16. The invention of claims 14 or 15, wherein the side of said low friction fabric which contacts said sheet of metal is impregnated with thermoplastic resin, and said process further comprises the further step of subjecting said resin to sufficient heat to bond together the materials in contact with the resin.

17. The invention of claim 16, wherein said die is a heatable die, and said step of subjecting said resin to heat comprises heating said die to heat said resin efficiently to bond together the materials in contact with the resin.

18. The invention of claims 14 or 15, wherein only one side of said low friction fabric is coated with said resin, and the step of juxtaposing said sheet of metal and said fabric comprises placing the side of said fabric coated with said resin against said sheet of metal.

19. The invention of claims 14 or 15, further comprising the steps of removing extraneous portions of fabric and metal.

20. The invention of claims 14 or 15, wherein said resin is heat curable, and further comprising the step of final heat curing said resin.

* * * * *